UNITED STATES PATENT OFFICE.

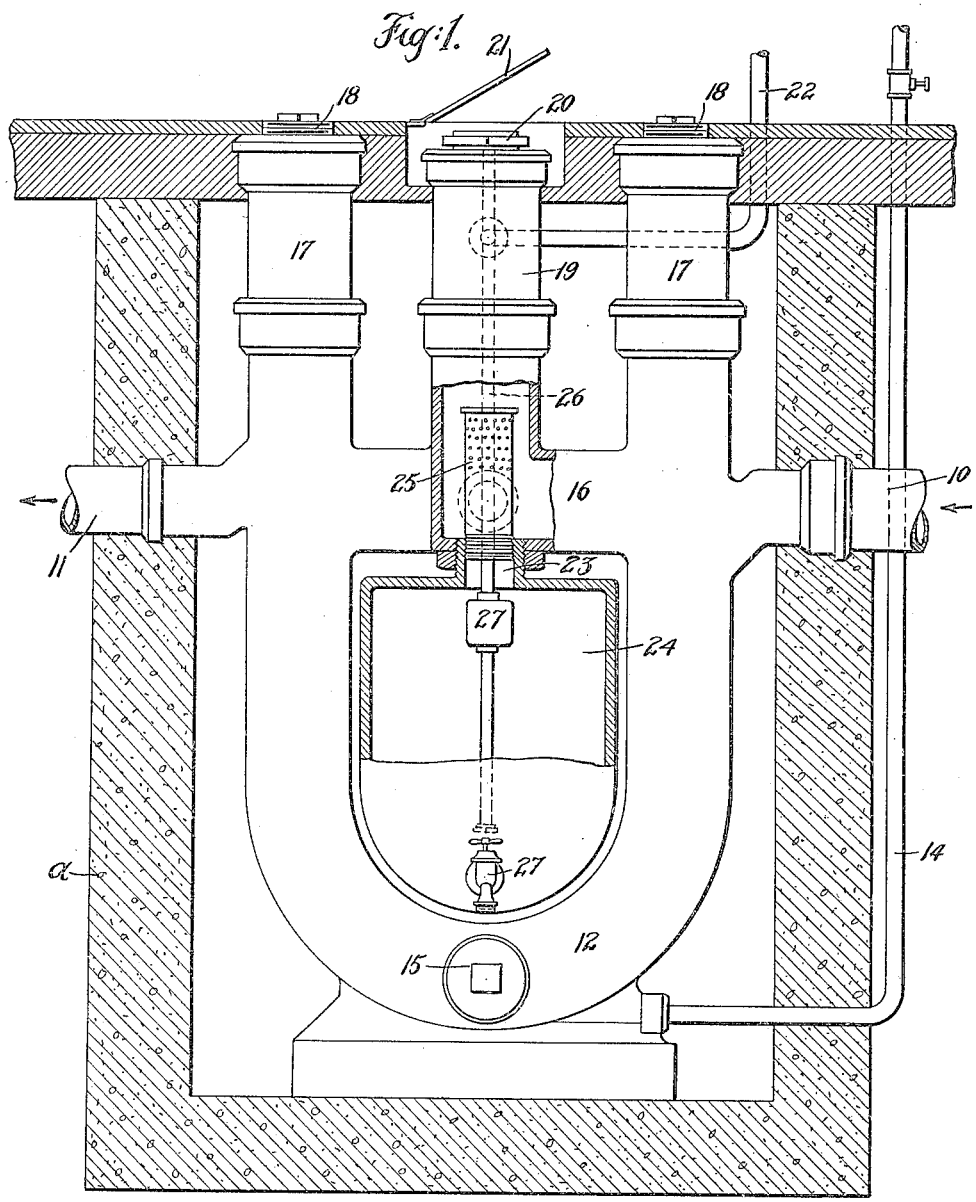

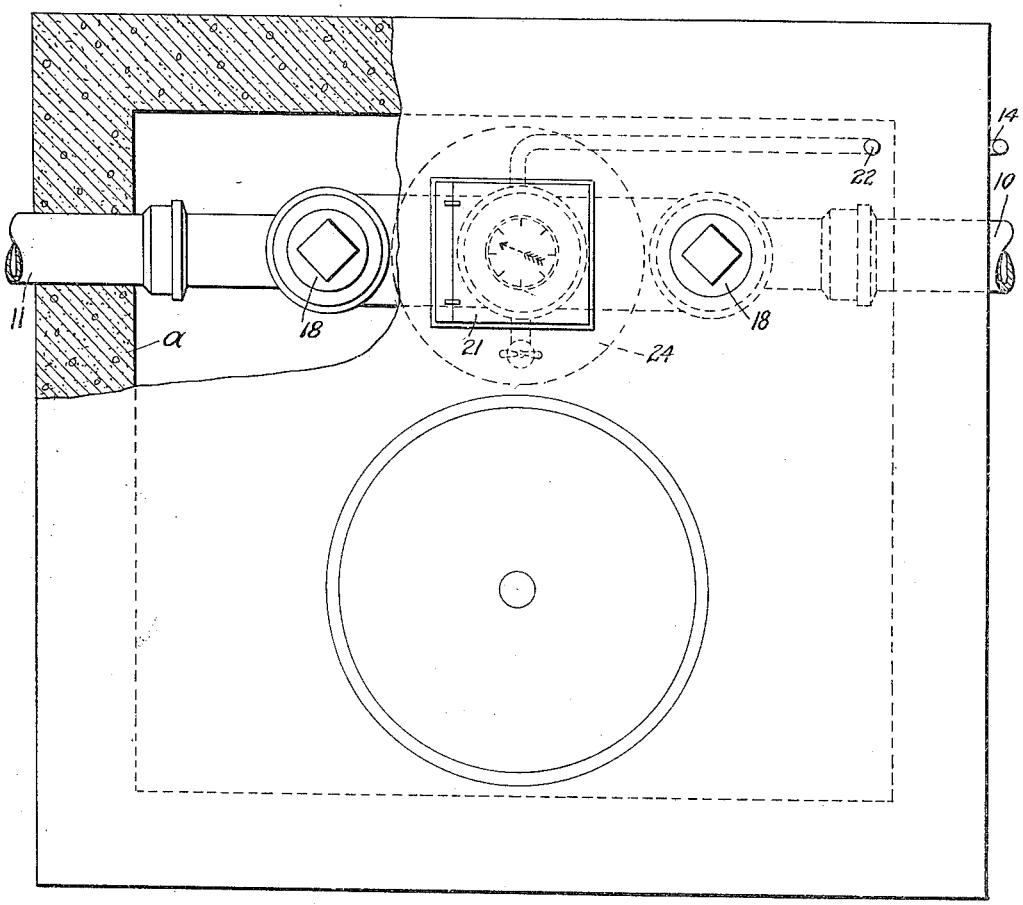

GEORGE V. ELLIS, OF NEW YORK, N. Y., ASSIGNOR TO THE GEORGE V. ELLIS PLUMBING & ENGINEERING CO., INC., OF NEW YORK, N. Y., A CORPORATION OF NEW YORK.

GASOLENE-SEPARATOR.

1,232,015.      Specification of Letters Patent.      Patented July 3, 1917.

Application filed January 19, 1917. Serial No. 143,214.

*To all whom it may concern:*

Be it known that I, GEORGE V. ELLIS, a citizen of the United States, and a resident of the borough of Manhattan, in the city and State of New York, have invented certain new and useful Improvements in Gasolene-Separators, of which the following is a description in such full, clear, and exact terms as will enable any person skilled in the art to which it pertains to make and use the same.

My invention relates to a machine for separating gasolene and other oils from water, the same being especially useful in garages and factories where gasolene drippings lie on the floor and are washed away with the water used in cleaning up the establishment.

Reference is had to the accompanying drawings which illustrate as an example the preferred embodiment of my invention.

In these drawings

Figure 1 is a sectional elevation of the machine with parts broken away and

Fig. 2 is a plan view also with parts broken away and parts shown in dotted lines.

The machine is preferably placed under the floor in a concrete pit indicated at *a* in the drawings though this is not essential.

10 is an inlet which receives the wash water, sweepings, gasolene and other oils and all other refuse that is washed off of the floor in the usual flushing operations. 11 is an outlet to the sewer which carries off the water and refuse. 12 is a bend which connects the inlet 10 and outlet 11 and has a flushing or cleanout pipe 14 leading thereinto and also a clean-out plug 15 at its bottom. 16 is a cross-connection at the top of the bend and 17 are clean-out risers which reach to the floor and are furnished with plugs or other forms of closures indicated at 18.

19 is a dome communicating with the cross-connection 16 the upper end of which has a plug 20 and is preferably placed under a lid or door 21 in the floor of the garage, factory or other building. 22 is a vent to the atmosphere which communicates with the upper part of the dome 19.

The dome 19 communicates at its bottom through a neck 23 with an oil chamber 24 which receives the gasolene and other oils that are separated from the drainage. A strainer tube 25 is screwed into the neck 23 and is adjustable therein for a purpose which will hereinafter appear. Passing through the dome 19 and strainer tube 25 and dipping down into the chamber 24 is a rod 26 which is connected at its upper end with the recording gage 28 (which may be part of plug 20) and at its lower end with a float 27, the float located in the tank or receiver 24. This float 27 and rod 26 in their details form no part of my invention but they may be any one of the various level recording gages used in connection with oil and gasolene and other tanks containing liquid, the position of the float being indicated by the gage so that a person looking at the gage may determine the amount of oil that has accumulated in the chamber 24. 27 is a pet-cock for drawing off the accumulated oil in the chamber 24.

In the operation of the device the oil laden drainage enters through the connection 10 and fills the bend 12. The outlet 11 is slightly above the level of the connection 10. The oil floats on top of the water and will lie in the cross-connection 16. The strainer 25 is adjusted so that these openings are in position to receive the oil which lies on top of the water in the cross-connection and this oil therefore drains down through the neck 23 into the tank 24. The water and other liquids than oil pass out by gravity through the outlet 11. The oil may be drained off from the tank 24 through the pet-cock 27 at will. The float 27 and its dial 20 and rod and other devices 26 will indicate to the observer the amount of oil that is accumulated in the tank. The lid 21 normally covers the dial 20 but by raising the lid 21 the dial is plainly visible.

What I claim is:—

1. An oil separator comprising a U-bend with an inlet at one limb and an outlet at the other, a cross-connection between said limbs and an oil drainage outlet in said cross-connection.

2. An oil separator comprising a U-bend with an inlet at one limb and an outlet at the other, a cross-connection between the limbs, an oil drainage outlet in the cross-connection and clean-out domes rising from each limb above the cross-connection.

3. An oil separator comprising a U-bend, an inlet at one limb and an outlet at the other, a cross-connection between the limbs, a tank communicating with the oil outlet in the cross-connection, a dome rising from said cross-connection and an oil level indicator device operating through the dome.

4. An oil separator comprising a U-bend, an inlet at one limb and an outlet at the other, a cross-connection between the limbs and the U-bend, an oil tank communicating with the cross-connection and an adjustable oil strainer in the cross-connection at said communication with the oil tank.

In testimony whereof I have hereunto signed my name in the presence of two witnesses.

GEO. V. ELLIS.

Witnesses:
PATRICK A. BOLGER,
ISAAC B. OWENS.

Copies of this patent may be obtained for five cents each, by addressing the "Commissioner of Patents, Washington, D. C."